US009940178B2

(12) United States Patent
Wang et al.

(10) Patent No.: US 9,940,178 B2
(45) Date of Patent: Apr. 10, 2018

(54) SYSTEM AND METHOD FOR INTEGRATING A TRANSACTIONAL MIDDLEWARE PLATFORM WITH A CENTRALIZED AUDIT FRAMEWORK

(71) Applicant: Oracle International Corporation, Redwood Shores, CA (US)

(72) Inventors: Yunhao Wang, Beijing (CN); Jimin (Jimmy) Cai, Beijing (CN); Wei Li, Beijing (CN); Lin Yang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/193,942

(22) Filed: Jun. 27, 2016

(65) Prior Publication Data
US 2017/0286188 A1 Oct. 5, 2017

Related U.S. Application Data

(63) Continuation of application No. PCT/CN2016/077972, filed on Mar. 31, 2016.

(51) Int. Cl.
*G06F 9/54* (2006.01)
*G06F 9/445* (2018.01)
(Continued)

(52) U.S. Cl.
CPC .......... *G06F 9/541* (2013.01); *G06F 9/44505* (2013.01); *G06F 9/44526* (2013.01); *G06F 11/3668* (2013.01); *H04L 67/42* (2013.01)

(58) Field of Classification Search
CPC ...................................... G06F 9/541
See application file for complete search history.

(56) References Cited

U.S. PATENT DOCUMENTS 7,627,853 B2 12/2009 Ibert
7,664,948 B2 2/2010 Moreau
(Continued)

FOREIGN PATENT DOCUMENTS

CN 101408955 4/2009
CN 103647794 3/2014

OTHER PUBLICATIONS

State Intellectual Property Office of the P.R. China, International Searching Authority, International Search Report and Written Opinion dated Dec. 29, 2016 for International Application No. PCT/CN2016/077972, 13 Pages.

*Primary Examiner* — Andy Ho
*Assistant Examiner* — Abdou Seye
(74) *Attorney, Agent, or Firm* — Tucker Ellis LLP

(57) ABSTRACT

In accordance with an embodiment, described herein is a system and method for integrating a transactional middleware platform with a centralized audit framework for a SOA middleware platform. An audit provider in the centralized audit framework can be provided as a plug-in module to the transactional middleware platform, and registered as an internal audit service therein. The internal audit service can be advertised on an audit server, and can process audit requests from within the transactional middleware platform. One or more configuration files can be provided to the audit provider, for use in generating audit data for audit events occurring in one or more components in the transactional middleware platform. The audit provider itself can be configured to represent an audit aware component within the centralized audit framework, thereby utilizing a plurality of functionalities available in the centralized audit framework, including saving the audit data in a central data store.

20 Claims, 7 Drawing Sheets

(51) Int. Cl.
    *G06F 11/36*     (2006.01)
    *H04L 29/06*     (2006.01)

(56) References Cited

U.S. PATENT DOCUMENTS

| | | |
|---|---|---|
| 7,886,281 B2 | 2/2011 | Smith |
| 8,423,973 B2 | 4/2013 | Saunders |
| 2008/0120696 A1* | 5/2008 | Desaraju ................. H04L 63/10 726/3 |
| 2010/0071066 A1* | 3/2010 | Kline ........................ G06F 8/60 726/25 |
| 2012/0222048 A1* | 8/2012 | Bharathula ......... G06F 11/3006 719/316 |

* cited by examiner

SYSTEM AND METHOD FOR INTEGRATING A TRANSACTIONAL MIDDLEWARE PLATFORM WITH A CENTRALIZED AUDIT FRAMEWORK

CLAIM OF PRIORITY

This application is a continuation of and claims the benefit of priority to International Application titled "SYSTEM AND METHOD FOR INTEGRATING A TRANSACTIONAL MIDDLEWARE PLATFORM WITH A CENTRALIZED AUDIT FRAMEWORK", International Application No. PCT/CN2016/077972, filed Mar. 31, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to middleware platforms, and are particularly related to a system and method for integrating a transactional middleware platform with a centralized audit framework for a service-oriented (SOA) middleware platform.

BACKGROUND

Today's enterprises are increasingly using audit data in compliance support, business intelligence, and analytics. Products that can centralize audit data from different systems into a common data store can provide advantages to these enterprises.

SUMMARY

In accordance with an embodiment, described herein is a system and method for integrating a transactional middleware platform with a centralized audit framework for a SOA middleware platform. An audit provider in the centralized audit framework can be provided as a plug-in module to the transactional middleware platform, and registered as an internal audit service therein. The internal audit service can be advertised on an audit server, and can process audit requests from within the transactional middleware platform. One or more configuration files can be provided to the audit provider, for use in generating audit data for audit events occurring in one or more components in the transactional middleware platform. The audit provider itself can be configured to represent an audit aware component within the centralized audit framework, thereby utilizing a plurality of functionalities available in the centralized audit framework, including saving the audit data in a central data store.

DETAILED DESCRIPTION

Figure 1:
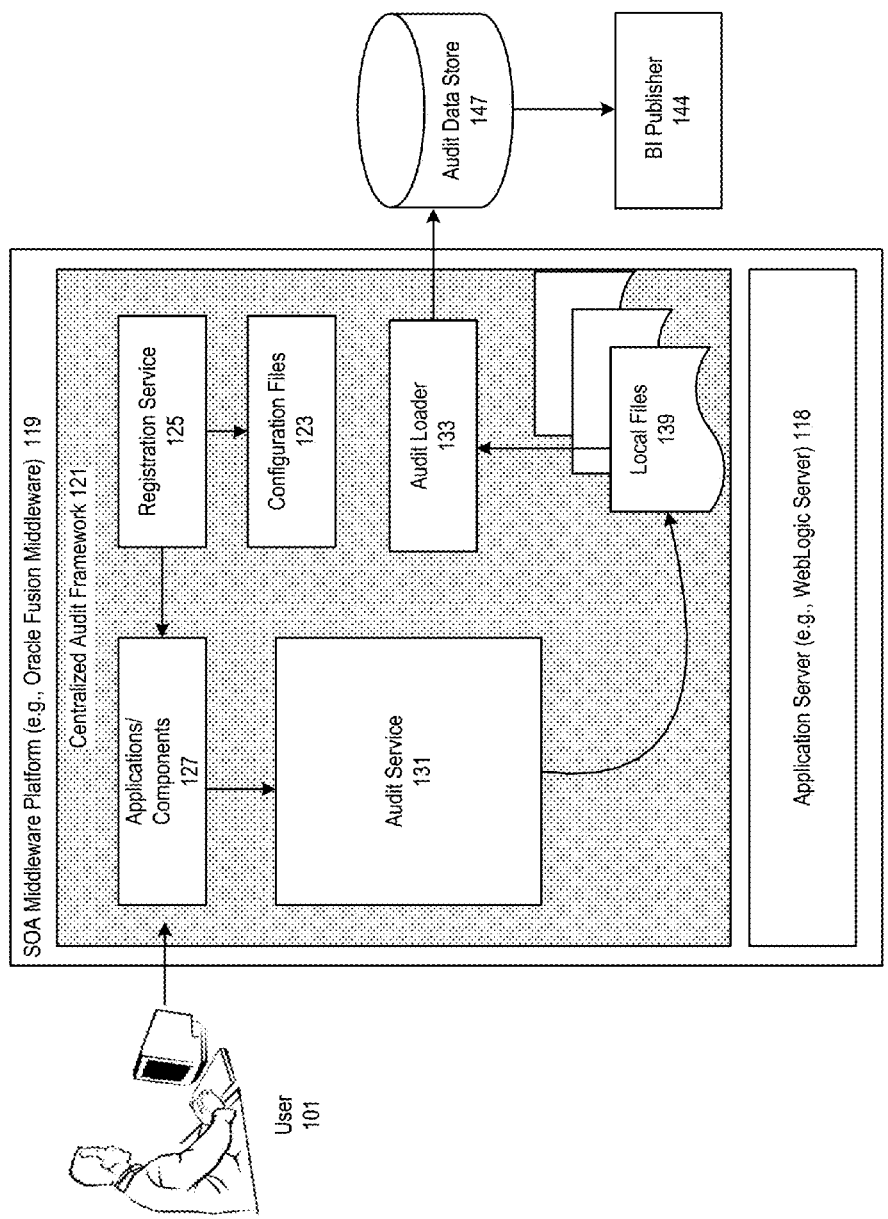
FIG. 1 illustrates a centralized audit framework for a SOA middleware platform, in accordance with an embodiment.

A centralized audit framework, such as Oracle Fusion Middleware Audit Framework, can provide a standards-based audit framework designed for use with a plurality of different types of software components, including applications and system components, in a service-oriented architecture (SOA) environment/platform.

A software component needs to be integrated with the centralized audit framework to become audit-aware, before audit policies can be configured, audit events can be audited, and audit records can be generated for the software component.

For example, Oracle Internet Directory is an example of an audit-aware component. Audit APIs provided by the centralized audit framework can be available for use by an audit aware component to manage audit policies and to audit the necessary information about a particular event happening in the component.

A transactional middleware platform or environment, such as Oracle's Tuxedo systems, can provide a framework, or middleware, for building scalable multi-tier client/server applications in heterogeneous (dissimilar), distributed environments. Integrating a transactional middleware platform with the centralized audit framework can bring a plurality of benefits, including centralized audit data storage, and easy management of audit policies using a common management interface.

In accordance with an embodiment, described herein is a system and method for integrating a transactional middleware platform with a centralized audit framework for a SOA middleware platform. An audit provider in the centralized audit framework can be provided as a plug-in module to the transactional middleware platform, and registered as an internal audit service therein. The internal audit service can be advertised on an audit server, and can process audit requests from within the transactional middleware platform. One or more configuration files can be provided to the audit provider, for use in generating audit data for audit events occurring in one or more components in the transactional middleware platform. The audit provider itself can be configured to represent an audit aware component within the centralized audit framework, thereby utilizing a plurality of functionalities available in the centralized audit framework, including saving the audit data in a central data store.

Middleware Platforms

Middleware platforms can provide a set of software modules that enable the construction, execution, and administration of high performance, distributed applications. A middleware platform can be a transaction-oriented system, for example, Oracle's Tuxedo system; or a service-oriented architecture (SOA) oriented system, for example, Oracle Fusion Middleware.

In accordance with an embodiment, applications targeted to a SOA-oriented middleware platform are typically standards-based web services, for example, Simple Object Access Protocol (SOAP) services or representational state transfer (REST) services. Each web service can be associated with a web service description language (WSDL) file, or a web application description language (WADL), that describes methods provided by the web service, and parameters required for accessing the web service.

Web services can be accessed by various web-based clients, including an application executing inside a web browser (for example, a Java Applet), a standalone Java application, another web service, or any program that accesses the web-bases services over a network connection using web protocols such as HTTP. A web service can communicate with another web-based client through XML messages.

In accordance with an embodiment, an application deployed to a transaction-oriented middleware platform or transactional middleware platform can comprise one or more client programs and one or more server programs. A client program of such an application can be developed, compiled and deployed as part of the application. For example, a client program can be compiled and linked with runtime libraries of the transactional middleware platform, for use in collecting input from a user, and sending requests to a server. A server program represents one or more application services that encapsulate business logic to process the input from a client.

In accordance with an embodiment, to be a client, a program needs to be able to invoke functions and procedures in a communication library (for example, Tuxedo's Application-to-Transaction-Monitor Interface, or ATMI) of the transactional middleware platform. A client can join an application by calling a client initialization routine in the communication library. Once a client joins an application, the client can define transaction boundaries and invoke functions in the communication library to communicate with application services in the application.

In accordance with an embodiment, before a client can send data to a server, the client needs to allocate a memory area/typed buffer (for example, a C structure or a COBOL record) from the runtime of a transactional middleware platform.

In accordance with an embodiment, a transactional middleware platform can include a shared memory (for example, Tuxedo's Bulletin Board) with information about clients and servers. A client can be a native client or a workstation client. A native client runs on a same machine wherein the shared memory exists, to directly access the shared memory to communicate with a server. A workstation client cannot access the shared memory, and needs to use TCP/IP sockets (for example, by executing a tpinit( ) call) to send messages to one or more server processes, which access the shared memory on behalf of the workstation client.

Application services in a transactional middleware platform can be exposed as web services to be accessible to web-based clients, using added-on products or extension interfaces to the transactional middleware platform.

For example, Oracle Service Architecture Leveraging Tuxedo (SALT) represents an added-on product that enables application services in a transactional middleware platform to participate in SOA environments. Java OnLine Transactions (JOLT) represents a Java-based interface that extends the functionality of existing application services to include Intranet- and Internet-wide availability.

In accordance with an embodiment, application services in a transactional middleware platform can also be made web accessible to web-based clients through a gateway (for example, WebLogic Tuxedo connector, or WTC) that bridges the two platforms.

Regardless which approach is used, events and activities associated with a particular service request across the different platforms can be correlated using an execution context identifier (ECID), which can be propagated with each request within a transactional middleware platform, and across different middleware platforms.

Centralized Audit Framework

As described above, a centralized audit framework, such as Oracle Fusion Middleware Audit Framework, can provide a standards-based audit framework designed for use with a plurality of different types of software components in a service-oriented architecture (SOA) environment/platform.

Additional benefits of a centralized audit framework can include capturing authentication history/failures, authorization history, user management, and other common transaction data, flexible audit policies, and tree-like policy structure which simplifies policy setup. Audit records can include baseline attributes, for example, outcome (status), event date-time, and user; event-specific attributes, for example, authentication method, source IP address, target user, and resource; and contextual attributes, for example, the execution context ID (ECID), and session ID.

FIG. 1 illustrates a centralized audit framework for a SOA middleware platform, in accordance with an embodiment.

As shown in FIG. 1, a centralized audit framework 121 can reside on an application server 118 executing in a service-oriented architecture (SOA) middleware platform (for example, Oracle's Fusion Middleware) 119, and can include an audit service 131. The audit service can be used by applications/components 127 to audit particular events occurring in the applications/components; and allow the applications/components to specify event details such as username and other attributes needed to provide the context of the events being audited.

In accordance with an embodiment, configuration files 123 can be provided to define a set of generic events for convenient mapping to application audit events. The centralized audit framework allows an application to define application-specific events.

In accordance with an embodiment, an application/component can be registered as an audit-aware component, so that audit policies can be configured, and events can be audited for the component. To be registered as an audit-aware component, one or more configuration files (for example, component_events.xml) can be packaged in the component's enterprise archive file (EAR). A registration service 125 can automatically process the configuration files when the application is deployed.

In accordance with an embodiment, the audit service can generate audit data and store the data in a plurality of local files 139 before the files are pushed to an audit data store 147. In the event that no audit data store is configured, audit data can remain in the local files. If an audit data store has been configured, the local files can act as an intermediary between a component being audited and the audit data store.

In accordance with an embodiment, the local files can be periodically uploaded to the data store based on a configurable time interval. Audit data from multiple components can be correlated and combined in reports. For example, authentication failures in all middleware components can be correlated and combined.

As further shown in FIG. 1, an audit loader 133 can be configured to load audit data from the local files to the audit data store. The audit data in the audit data store can be exposed through pre-defined reports in a business intelligence publisher 144. The reports allow users to drill down the audit data based on various criteria, for example, username, time range, application type and execution context identifier (ECID).

Integration with a Centralized Audit Framework

In accordance with an embodiment, the system can integrate a transactional middleware platform with a centralized audit framework for a SOA middleware platform. An audit provider in the centralized audit framework can be provided as a plug-in module to the transactional middleware platform, and registered as an internal audit service therein. The internal audit service can be advertised on an audit server, and can process audit requests from within the transactional middleware platform. One or more configuration files can be provided to the audit provider, for use in generating audit data for audit events occurring in one or more components in the transactional middleware platform. The audit provider itself can be configured to represent an audit aware component within the centralized audit framework, thereby utilizing a plurality of functionalities available in the centralized audit framework, including saving the audit data in a central data store.

In accordance with an embodiment, the plug-in module can be disabled or enabled using a tool or a command, for example, epifreg command for plug-in modules registration.

In accordance with an embodiment, the audit server can be a domain-level multi-threaded Java server and can be configured in a domain configuration file of the transactional middleware platform. The domain configuration file can be a text file, for example, UBBCON FIG.

In accordance with an embodiment, runtime support for the Java server can be provided by an object oriented version (for example, JATMI) of the communication interface in the transactional middleware platform. The internal audit service can be implemented in Java, and can receive requests from a plurality of clients (for example, native clients and work station clients) to the transactional middleware platform.

Figure 2:
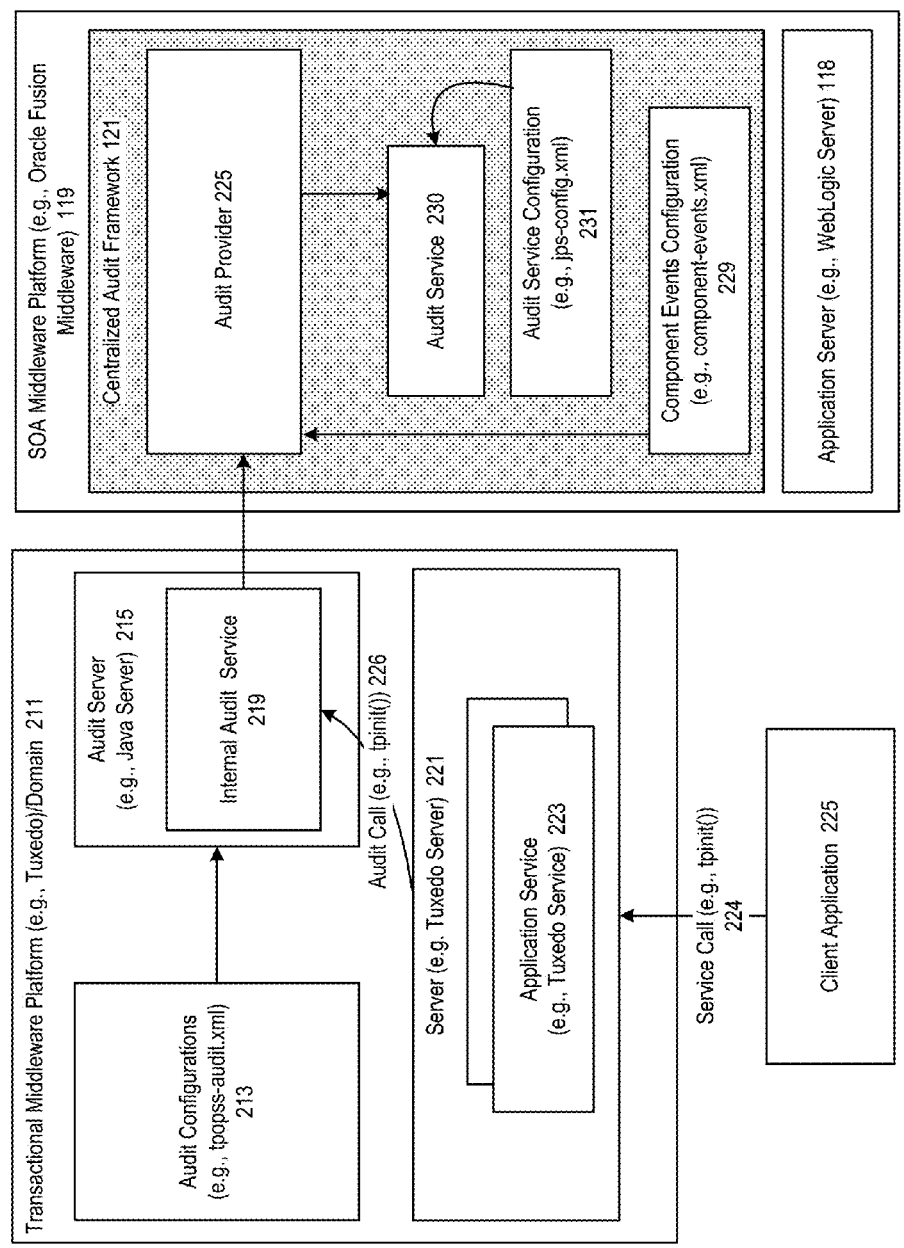
FIG. 2 illustrates a system for integrating a transactional middleware platform with a centralized audit framework, in accordance with an embodiment.

FIG. 2 illustrates a system for integrating a transactional middleware platform with a centralized audit, in accordance with an embodiment.

As shown in FIG. 2, a transactional middleware platform domain (for example, a Tuxedo domain) 211 can include an application server 221 with one or more application services, for example, application service 223. The application services can be native Tuxedo services implemented in non-Java languages, and can receive service calls 224 from a client application 225.

As further shown, the system can include an audit server 215 that can advertise an internal audit service 219 for receiving one or more audit calls 226 from an application service, in response to the application service receiving service calls from the client application.

In accordance with an embodiment, the internal audit service can represent an audit provider 225 that has been registered as a plug-in module with the transactional middleware platform. Alternatively, the internal audit service can be a reference service to the audit provider 225, and can be used to invoke APIs exposed by the audit provider.

In accordance with an embodiment, the audit provider can invoke an audit service 230 in the centralized audit framework to generate audit data. The audit service can be configured by an audit service configuration file (for example, jps-config.xml) 231.

In accordance with an embodiment, executables (for example, oracle-audit-provider.jar) of the audit provider can be placed in a designated directory (for example, "${ORACLE_HOME}/modules/") under a directory that stores the runtime environment of the SOA middleware platform.

In accordance with an embodiment, a library (for example, a Jar file) in the audit server and a disk-based repository in the transactional middleware platform for storing information for the plug-in module, can be used to facilitate the integration between the transactional middleware platform and the centralized audit framework.

In accordance with an embodiment, the audit server can be associated with one or more configuration files (for example, tpopss-audit.xml) 213, for use in configuring the audit server and the internal audit service thereon to communicate with the audit provider.

In accordance with an embodiment, in response to an audit call, the audit server can call the internal audit service to generate audit data based on a component events configuration file (for example, component-events.xml) 229. The configuration file can define audit events in the transactional middleware platform, and that can be processed by the audit provider.

Table 1 illustrates a list of audit events defined for the transactional middleware platform, in accordance with an embodiment.

TABLE 1

| Operation | Description |
| --- | --- |
| SERVICECALL | Tuxedo service call occurs, tpcall invoked |
| ENQUEUE | Tuxedo enqueue event occurs, tpenq invoked |
| DEQUEUE | Tuxedo dequeue event occurs, tpdeq invoked |
| POST | Tuxedo post event occurs, tppost invoked |
| CONNECT | Tuxedo connect event occurs, tpconnect invoked |
| IMPERSONATE | Tuxedo impersonate event occurs |
| LOGON | Tuxedo logon event occurs, after authentication failed in client invoke tpinit( ) |
| LOGOFF | Tuxedo logoff event occurs |
| DECRYPT | Tuxedo decrypt event occurs |
| SERVICESIGNATURE | Tuxedo service signature event occurs |
| SERVICEENCRYPTION | Tuxedo service encryption event occurs |
| QUEUESIGNATURE | Tuxedo queue signature event occurs |
| QUEUEENCRYPTION | Tuxedo queue encryption event occurs |
| EVENTSIGNATURE | Tuxedo event signature occurs |

Figure 3:
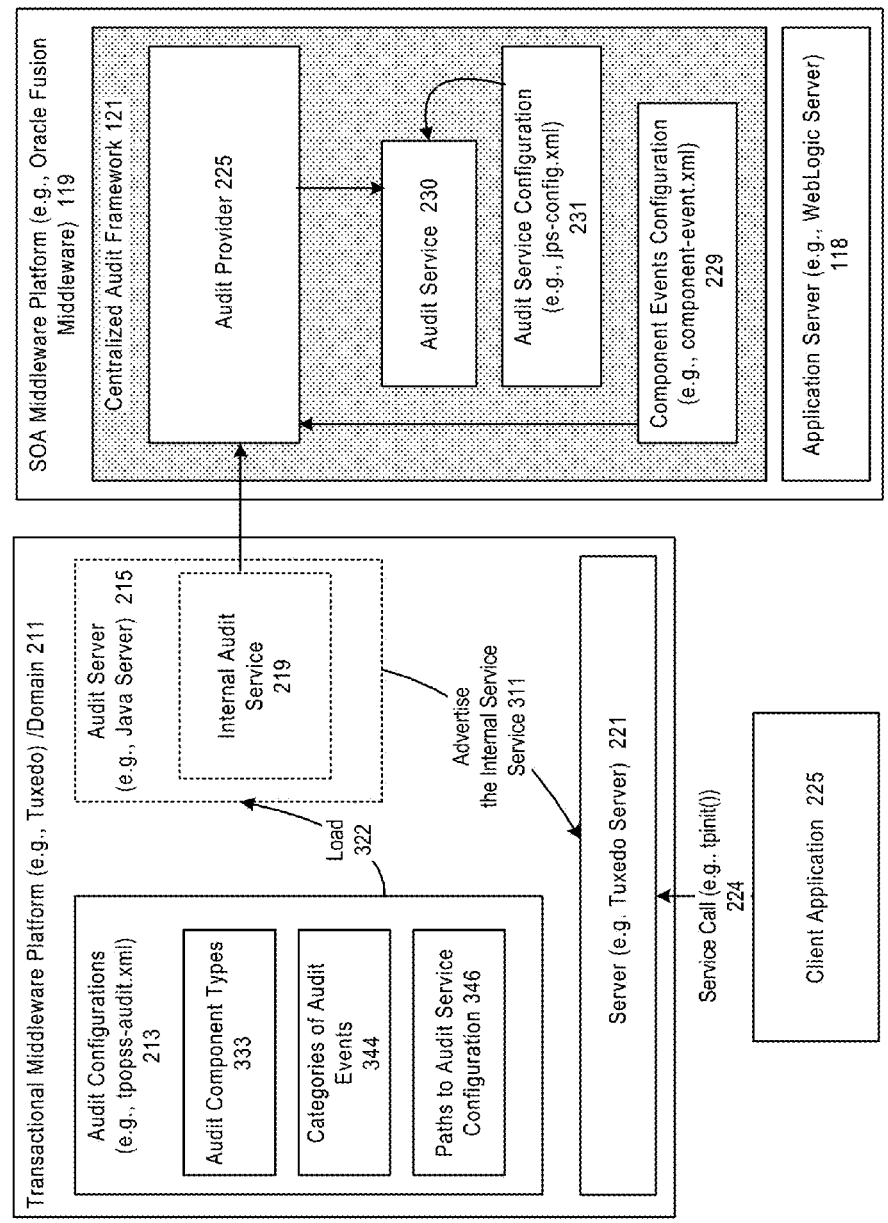
FIG. 3 further illustrates a system for integrating a transactional middleware platform with a centralized audit framework, in accordance with an embodiment.

FIG. 3 further illustrates a system for integrating a transactional middleware platform with a centralized audit framework, in accordance with an embodiment.

As shown in FIG. 3, the configuration files associated with the audit server can include a path (for example, an absolute path) 346 to the configuration file for the audit service used by the audit provider; a path to the executables of the audit provider; and a path to the library used to invoke the audit provider. The configuration files can also define types of components (for example, a Tuxedo application) 333 for the internal audit service to audit, and categories of audit events 344 associated with the defined component types.

In accordance with an embodiment, when the audit server starts, the audit server can load 322 the configurations, and advertise 311 the internal audit service to application servers in the transactional middleware platform domain in which the audit server is running, so that the application servers can send audit calls to the audit server.

Figure 4:
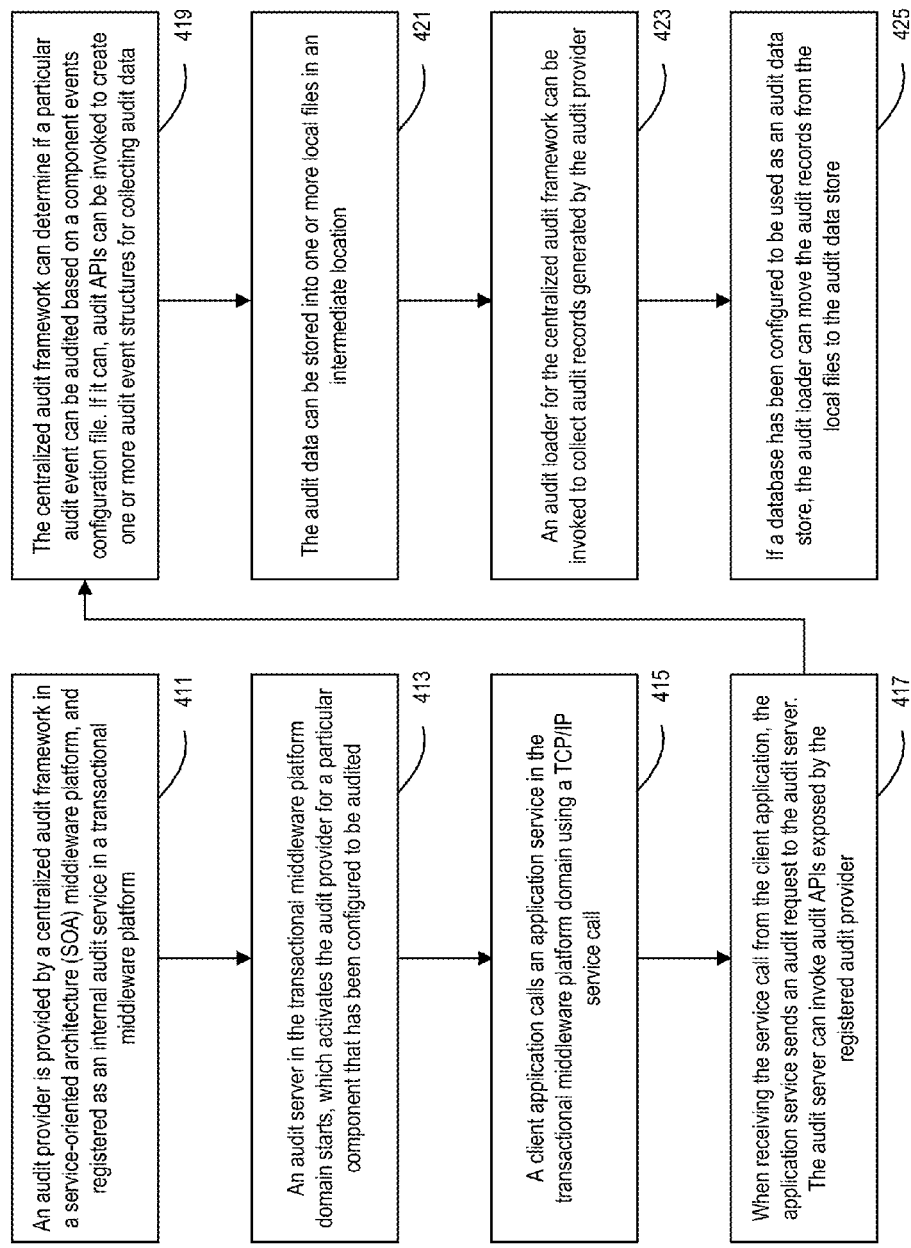
FIG. 4 illustrates an audit flow in a system for integrating a transactional middleware platform with a centralized audit, in accordance with an embodiment.

FIG. 4 illustrates an audit flow in a system for integrating a transactional middleware platform with a centralized audit, in accordance with an embodiment.

As shown in FIG. 4, at step 411, an audit provider in a centralized audit framework is registered as an internal service in a transactional middleware platform domain.

At step 413, an audit server in the transactional middleware platform domain starts, which activates the audit provider for a particular component that has been configured to be audited. When the audit provider is activated, audit APIs in the centralized audit framework can load an audit provider configuration file, and a component events configuration file provided by an administrator or developer.

At step 415, a client application calls an application service in the transactional middleware platform domain, using a TCP/IP call, for example, a tpinit( ) call.

At step 417, when receiving a service call from the client application, the application service sends an audit request to the audit server. The audit server can invoke audit APIs exposed by the registered audit provider.

At step 419, the centralized audit framework can determine if a particular audit event can be audited based on a component events configuration file. If it can, audit APIs can be invoked to create audit one or more event structures for collecting audit data, including status information, initiator, resource, and ECID.

At step 421, the audit data can be stored into one or more local files in an intermediate location.

At step 423, an audit loader for an active instance of the centralized audit framework can be invoked to collect audit records for all components running in that instance, including audit records generated by the registered audit provider, which has been implemented as an audit aware component in the centralized audit framework.

At step 425, if a database has been configured to be used as an audit data store, the audit loader can move the audit records from the local files to the audit data store.

Figure 5:
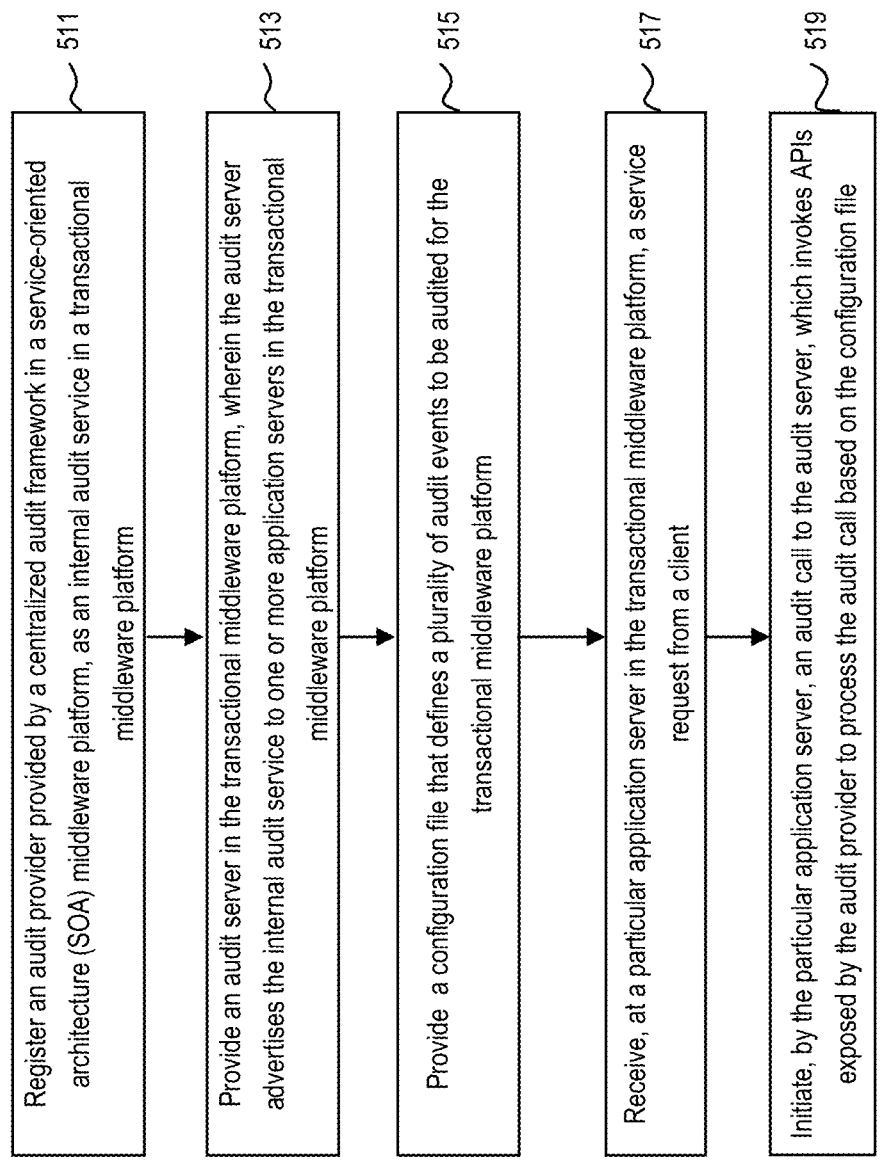
FIG. 5 illustrates a method for integrating a transactional middleware platform with a centralized audit framework, in accordance with an embodiment.

FIG. 5 illustrates a method for integrating a transactional middleware platform with a centralized audit framework, in accordance with an embodiment.

As shown in FIG. 5, at step 511, an audit provider in a centralized audit framework in a SOA middleware platform can be registered as an internal service to a transactional middleware platform.

At step 513, an audit server can be provided in a domain of a transactional middleware platform, wherein the audit server advertises an internal audit service that can represents the registered audit provider.

At step 515, a configuration file can be provided for use by the audit provider, wherein the configuration can define audit events for the transactional middleware platform.

At step 517, when an application server in the transactional middleware platform receives a service call from a client, the application server can initiate an audit call to the audit server.

At step 519, in response to the audit call, the audit server can invoke APIs exposed by the audit provider, which can process the audit call based on the configuration file, to generate audit data to be saved in a central audit data store.

Figure 6:
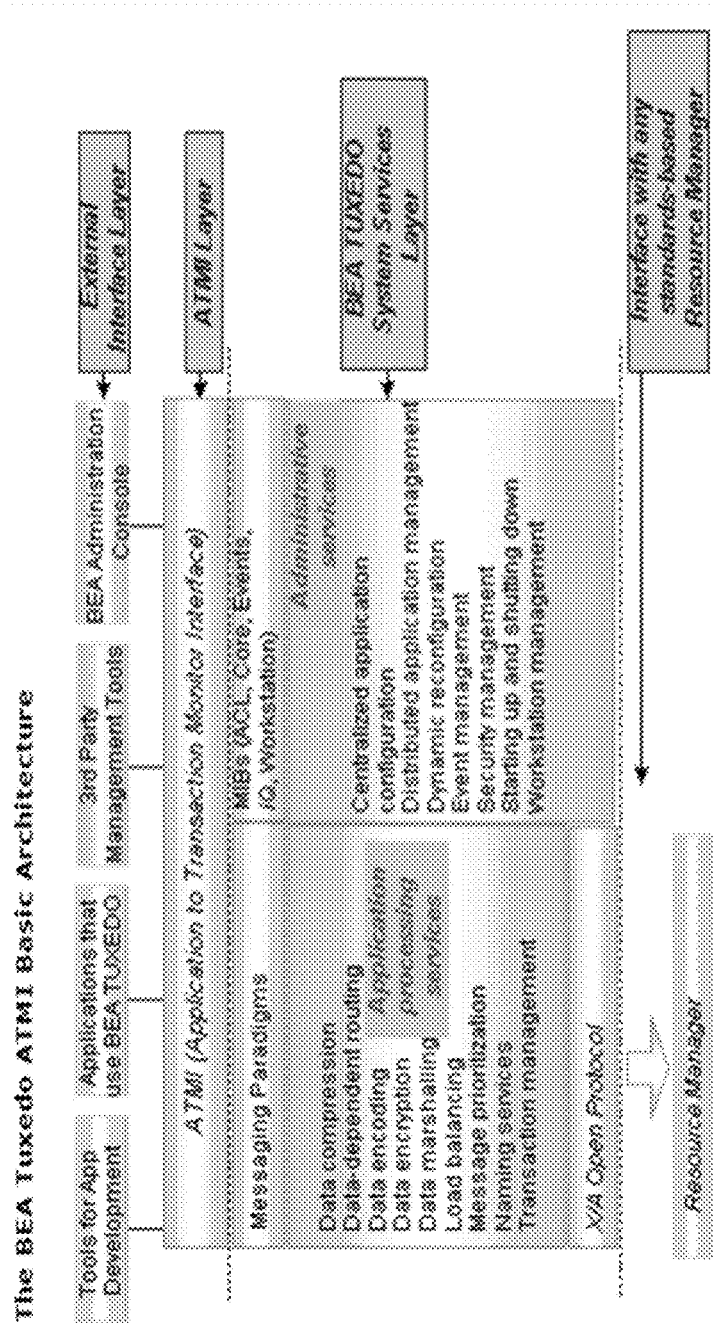
FIGS. 6-7 illustrate an exemplary transactional middleware platform, in accordance with an embodiment.
Figure 7:
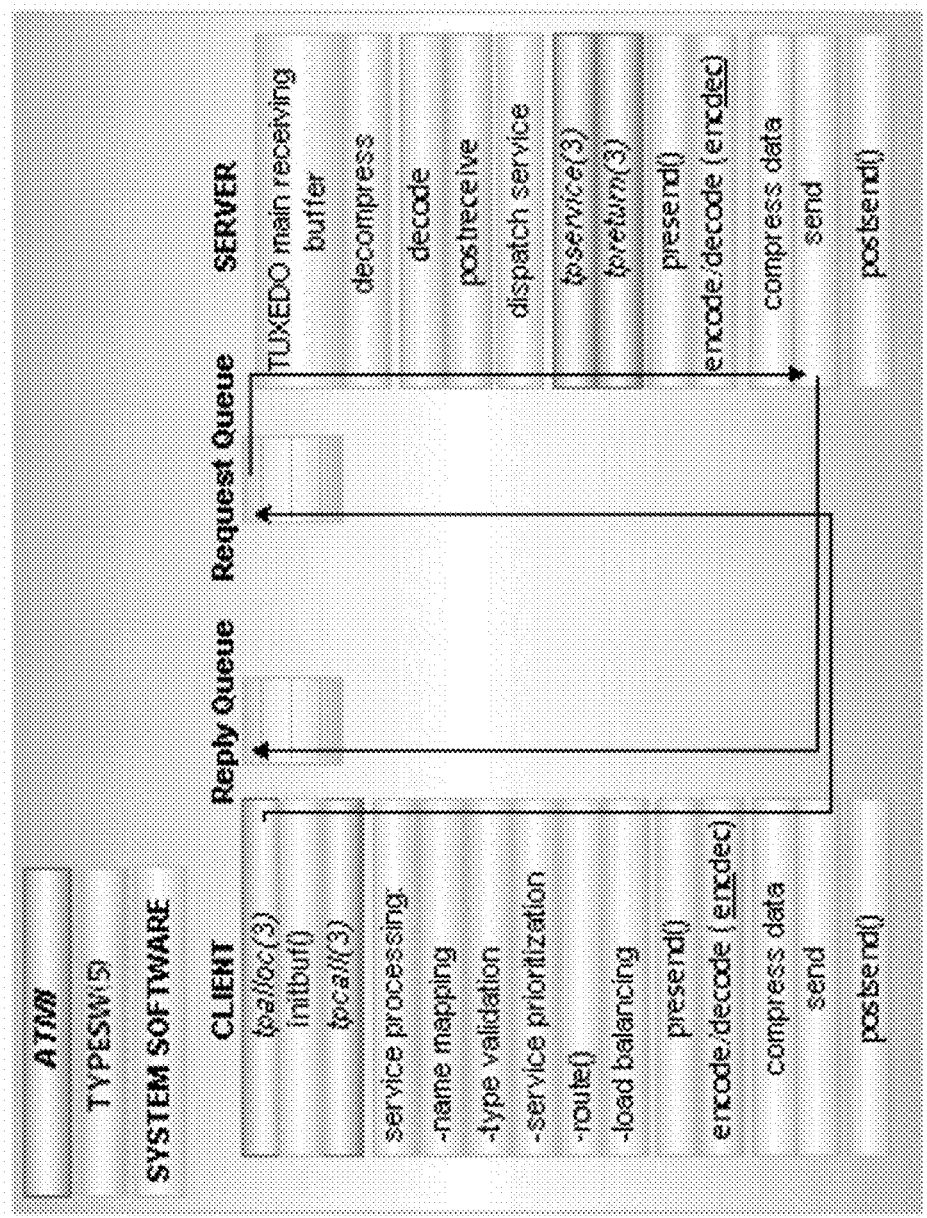

FIGS. 6-7 illustrate an exemplary transactional middleware platform, in accordance with an embodiment.

In accordance with an embodiment, Tuxedo (Transactions for UNIX, Enhanced for Distributed Operation) can be a transactional middleware platform described in various embodiments of the present invention.

Tuxedo represents a middleware product or system that can operate as an extension of an operation system (for example, UNIX). As a platform for execution and development, Tuxedo is designed for the creation and administration of e-commerce online transaction processing (OLTP) systems.

In accordance with an embodiment, the Tuxedo system shown in FIG. 6 can include an Application-to-Transaction Monitor Interface (ATMI) environment for use in communications, transactions, and management of data buffers.

As shown in FIG. 6, the ATMI environment can include an external interface layer 611, an ATMI layer 613, a system services layer 615, and a resource manager layer 617. The external interface layer can provide a plurality of interfaces between users and the ATMI environment. The ATMI layer can represent an interface between applications and the ATMI environment. The system services layer can provide services and/or capabilities for developing and administering applications.

In accordance with an embodiment, the Tuxedo system can use a message-based communications system to distribute applications across various operating system platforms and databases.

As shown in FIG. 7, communication within the ATMI environment can be accomplished by transferring messages. The Tuxedo system can pass service request messages between ATMI clients and servers through operating system (OS) inter-process communications (IPC) message queues. System messages and data can be passed between OS-supported, memory-based queues of clients and servers in buffers.

In accordance with an embodiment, messages in the ATMI environment can be packaged in typed buffers, which can represent buffers that contain both message data and data identifying the types of message data being sent.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for integrating a server environment with an audit framework, comprising:
    a microprocessor;
    a transactional middleware platform executing on the microprocessor; and
    a centralized audit framework that includes an audit provider, wherein the audit provider is registered with the transactional middleware platform as an internal audit service, and exposes a plurality of application programming interfaces (APIs) configured to process audit calls;
    wherein the transactional middleware platform includes
        a server program deployed thereon, wherein the server program is configured to receive requests from a client program through an inter-process communication (IPC) message queue, wherein each of the requests is sent from the client program to the server program using a typed buffer allocated to the client program from a runtime of the transactional middleware platform;
        a shared memory with information describing the server program and the client program, to enable the client program and the server program to communicate with each other through the shared memory, and
        a Java server that advertises the internal audit service to the server program, and loads one or more configuration files that specifies a path of a configuration file for the audit provider,
        wherein the configuration file defines a plurality of audit events to be audited for the transactional middleware platform;
    wherein the server program, in response to receiving a request from the client program, initiates an audit call to the Java server, which invokes one or more of the APIs exposed by the audit provider to process the audit call based on the configuration file.

2. The system of claim 1, wherein the internal audit service is a Java service.

3. The system of claim 1, wherein the audit provider is a plug-in module to the transactional middleware platform.

4. The system of claim 1, wherein the Java server is a domain-level application server.

5. The system of claim 1, wherein the audit provider is configured to be an audit-aware component in the centralized audit framework.

6. The system of claim 1, wherein the audit provider operates to convert incoming audit events from the transactional middleware platform to formats appropriate for the one or more APIs to process.

7. The system of claim 1,
    wherein the client program and the server program are part of a deployed application in the transactional middleware platform.

8. The system of claim 1, wherein the transactional middleware platform uses a message-based communications system to distribute applications across a plurality of different types of operating system platforms and databases.

9. The system of claim 1, wherein the transactional middleware platform includes an Application-to-Transaction Monitor Interface (ATMI) environment for transferring messages between one or more client programs and one or more server programs.

10. A method for integrating a server environment with an audit framework executing on one or more microprocessors, comprising:
    deploying a server program in a transactional middleware platform that includes a shared memory with information describing the server program and a client program to enable the client program and the server program to communicate with each other through the shared memory, wherein the server program is configured to receive requests from the client program through an inter-process communication (IPC) message queue, wherein each of the requests is sent from the client program to the server program using a typed buffer allocated to the client program from a runtime of the transactional middleware platform;
    registering an audit provider in a centralized audit framework with the transactional middleware platform as an internal audit service;
    advertising the internal audit service on a Java server in the transactional middleware platform to the server program;
    loading one or more configuration files that specifies a path of a configuration file for the audit provider, wherein the configuration file defines a plurality of audit events to be audited for the transactional middleware platform;
    receiving, at the server program, a request from the client program; and
    initiating, by the server program, an audit call to the Java server, which invokes one or more of the APIs exposed by the audit provider to process the audit call based on the configuration file.

11. The method of claim 10, wherein the internal audit service is a Java service.

12. The method of claim 10, wherein the audit provider is a plug-in module to the transactional middleware platform.

13. The method of claim 10, wherein the Java server is a domain-level application server.

14. The method of claim 10, wherein the audit provider is configured to be an audit-aware component in the centralized audit framework.

15. The method of claim 10, wherein the audit provider operates to convert incoming audit events from the transactional middleware platform to formats appropriate for the one or more APIs to process.

16. The method of claim 10,
    wherein the client program and the server program are part of a deployed application in the transactional middleware platform.

17. The method of claim 10, wherein the transactional middleware platform uses a message-based communications system to distribute applications across a plurality of different types of operating system platforms and databases.

18. The method of claim 10, wherein the transactional middleware platform includes an Application-to-Transaction Monitor Interface (ATMI) environment for transferring messages between one or more client programs and one or more server programs.

19. A non-transitory computer-readable storage medium storing a set of instructions for integrating a server environment with an audit framework, said instructions, when executed by one or more processors, causing the one or more processors to perform steps comprising:

deploying a server program in a transactional middleware platform that includes a shared memory with information describing the server program and a client program to enable the client program and the server program to communicate with each other through the shared memory, wherein the server program is configured to receive requests from the client program through an inter-process communication (IPC) message queue, wherein each of the requests is sent from the client program to the server program using a typed buffer allocated to the client program from a runtime of the transactional middleware platform;

registering an audit provider in a centralized audit framework with the transactional middleware platform as an internal audit service;

advertising the internal audit service on a Java server in the transactional middleware platform to the server program;

loading one or more configuration files that specifies a path of a configuration file for the audit provider, wherein the configuration file defines a plurality of audit events to be audited for the transactional middleware platform;

receiving, at the server program, a request from the client program; and initiating, by the server program, an audit call to the Java server, which invokes one or more of the APIs exposed by the audit provider to process the audit call based on the configuration file.

20. The non-transitory computer-readable storage medium of claim 19, wherein the internal audit service is a Java service.

\* \* \* \* \*